United States Patent
Antheunis

(10) Patent No.: US 9,944,765 B2
(45) Date of Patent: Apr. 17, 2018

(54) CURABLE COMPOSITIONS AND MEMBRANES

(71) Applicant: Fujifilm Manufacturing Europe B.V., Tilburg (NL)

(72) Inventor: Harro Antheunis, Tilburg (NL)

(73) Assignee: Fujifilm Manufacturing Europe B.V. (NL)

( * ) Notice: Subject to any disclaimer, the term of this patent is extended or adjusted under 35 U.S.C. 154(b) by 0 days.

(21) Appl. No.: 15/303,294

(22) PCT Filed: Apr. 21, 2015

(86) PCT No.: PCT/GB2015/051180
§ 371 (c)(1),
(2) Date: Oct. 11, 2016

(87) PCT Pub. No.: WO2015/166213
PCT Pub. Date: Nov. 5, 2015

(65) Prior Publication Data
US 2017/0037206 A1 Feb. 9, 2017

(30) Foreign Application Priority Data

Apr. 28, 2014 (GB) .................................. 1407397.7

(51) Int. Cl.
| | | |
|---|---|---|
| *C08F 222/10* | (2006.01) | |
| *B01D 71/44* | (2006.01) | |
| *B01D 71/82* | (2006.01) | |
| *B01D 71/40* | (2006.01) | |
| *B01D 71/46* | (2006.01) | |
| *C08J 5/22* | (2006.01) | |
| *B01D 53/22* | (2006.01) | |
| *B01D 61/42* | (2006.01) | |
| *B01D 71/54* | (2006.01) | |
| *C02F 1/469* | (2006.01) | |
| *C08F 220/32* | (2006.01) | |
| *C08F 220/36* | (2006.01) | |
| *B01D 61/44* | (2006.01) | |
| *C08F 220/34* | (2006.01) | |

(52) U.S. Cl.
CPC .......... *C08J 5/2243* (2013.01); *B01D 53/228* (2013.01); *B01D 61/422* (2013.01); *B01D 71/40* (2013.01); *B01D 71/44* (2013.01); *B01D 71/46* (2013.01); *B01D 71/54* (2013.01); *B01D 71/82* (2013.01); *C02F 1/4691* (2013.01); *C02F 1/4695* (2013.01); *C08F 220/32* (2013.01); *C08F 220/36* (2013.01); *C08F 222/10* (2013.01); *C08J 5/2231* (2013.01); *B01D 61/44* (2013.01); *B01D 2323/30* (2013.01); *B01D 2323/345* (2013.01); *B01D 2325/14* (2013.01); *B01D 2325/16* (2013.01); *B01D 2325/42* (2013.01); *C02F 2201/46* (2013.01); *C08F 2220/346* (2013.01); *C08J 2333/02* (2013.01); *C08J 2335/02* (2013.01)

(58) Field of Classification Search
CPC ...... C08J 5/2243; C08J 5/2231; C08F 222/10; C08F 220/32; C08F 220/36; B01D 71/44; B01D 71/82; B01D 71/40; B01D 71/46; B01D 71/54; B01D 53/228; B01D 61/422; B01D 61/44; C02F 1/4691; C02F 1/4695
USPC .......................................................... 521/27
See application file for complete search history.

(56) References Cited

U.S. PATENT DOCUMENTS

| | | | |
|---|---|---|---|
| 5,310,779 A | 5/1994 | Lai | |
| 6,423,666 B1 * | 7/2002 | Liao ...................... | B01J 20/261 210/198.2 |
| 7,604,746 B2 * | 10/2009 | Childs .................. | B01D 61/362 210/490 |
| 7,700,781 B2 | 4/2010 | Ignatyev et al. | |
| 8,956,782 B2 * | 2/2015 | Van Berchum .......... | B01J 39/20 204/282 |
| 8,956,783 B2 | 2/2015 | Antheunis et al. | |
| 8,968,963 B2 * | 3/2015 | Van Berchum .......... | B01J 39/20 204/282 |
| 8,968,964 B2 * | 3/2015 | Antheunis .............. | B01D 61/44 204/282 |
| 8,968,965 B2 * | 3/2015 | Antheunis .............. | B01D 61/44 204/157.6 |
| 9,259,685 B2 * | 2/2016 | Antheunis .............. | B01D 61/44 |

(Continued)

FOREIGN PATENT DOCUMENTS

| | | | | |
|---|---|---|---|---|
| WO | WO 2005076396 A1 * | 8/2005 | ............ | H01B 1/122 |
| WO | 2007018425 A1 | 2/2007 | | |

(Continued)

OTHER PUBLICATIONS

International Search Report issued from corresponding PCT/GB2015/051180, dated Jul. 22, 2015.

*Primary Examiner* — Michael M Bernshteyn
(74) *Attorney, Agent, or Firm* — Banner & Witcoff, Ltd.

(57) ABSTRACT

A method for preparing an ionically-charged membrane comprising the steps (1) applying a film of curable composition to a support; (2) curing the film of curable composition to give anionically-charged membrane; and (3) removing the ionically-charged membrane from the support; wherein the curable composition comprises a) 5 to 50 wt % of curable compound comprising one ethylenically unsaturated group and anionic group; b) 10 to 70 wt % of crosslinking agent comprising at least two ethylenically unsaturated groups and having a molecular weight of at least 500 dalton per ethylenically unsaturated group; and c) 5 to 60 wt % of inert solvent.

17 Claims, No Drawings

(56) References Cited

U.S. PATENT DOCUMENTS

| | | | |
|---|---|---|---|
| 9,539,548 B2 * | 1/2017 | Antheunis | B01D 61/44 |
| 9,556,316 B2 * | 1/2017 | Antheunis | B01D 71/40 |
| 2012/0248028 A1 | 10/2012 | Antheunis et al. | |
| 2012/0259027 A1 | 10/2012 | Van Berchum et al. | |
| 2013/0313187 A1 | 11/2013 | Yin et al. | |
| 2014/0353241 A1 | 12/2014 | Yin et al. | |
| 2014/0357740 A1 | 12/2014 | Yin et al. | |
| 2015/0105481 A1 | 4/2015 | Hessing et al. | |
| 2015/0259488 A1 | 9/2015 | Takamoto et al. | |
| 2015/0290594 A1 | 10/2015 | Van Berchum et al. | |
| 2016/0038888 A1 | 2/2016 | Yin et al. | |
| 2016/0137797 A1 | 5/2016 | Antheunis | |

FOREIGN PATENT DOCUMENTS

| | | |
|---|---|---|
| WO | 2012/045152 A1 | 4/2012 |
| WO | 2013/011272 A1 | 1/2013 |
| WO | 2014050993 A1 | 4/2014 |

\* cited by examiner

CURABLE COMPOSITIONS AND MEMBRANES

RELATED APPLICATIONS

This application is a National Stage Application under 35 U.S.C. 371 of co-pending PCT application PCT/GB2015/051180 designating the United States and filed Apr. 21, 2015; which claims the benefit of GB application number 1407397.7 and filed Apr. 28, 2014 each of which are hereby incorporated by reference in their entireties.

This invention relates to curable compositions, to their use in the preparation of membranes and to the use of such membranes in ion exchange processes.

Ionically-charged membranes are useful in a number of applications, including electrodeionisation (EDI), continuous electrodeionisation (CEDI), electrodialysis (ED), electrodialysis reversal (EDR) and capacitive deionisation used in e.g. flow through capacitors (FTC) for the purification of water, Donnan or diffusion dialysis (DD) for e.g. fluoride removal or the recovery of acids, pervaporation for dehydration of organic solvents, fuel cells, electrolysis (EL) of water, treatment of blowdown water in cooling tower systems, or for chlor-alkali production, and reverse electrodialysis (RED) where electricity is generated from two streams differing in salt concentration separated by an ion-permeable membrane.

EDI is a water treatment process wherein ions are removed from aqueous liquids using a membrane and an electrical potential to effect ion transport. It differs from other water purification technologies, such as conventional ion exchange, in that it is does not require the use of chemicals such as acids or caustic soda. EDI can be used to produce ultra pure water.

ED and EDR are electrochemical separation processes that remove ions and other charged species from water and other fluids. ED and EDR use small quantities of electricity to transport these species through membranes composed of ionically-charged material to create separate purified and concentrated streams. Ions are transferred through the membranes by means of direct current (DC) voltage and are removed from the feed water as the current drives the ions through the membranes to desalinate the process stream. ED and EDR are suitable techniques for producing drinking water. Ionically-charged membranes are also used in Zero Liquid Discharge (ZLD) and Zero Discharge Desalination (ZDD).

A membrane electrode assembly (MEA) appears suitable for a variety of applications such as electrolysis, sensors and especially fuel cells.

Membranes currently used in ion exchange are typically composite membranes comprising a porous support impregnated with an ionically-charged polymer. The porous support provides strength to the membrane while the ionically-charged polymer allows oppositely charged ions to pass through the composite membrane while repelling like-charged ions.

WO 2012/045152 describes a method for preparing composite membranes comprising the steps of:
A. selecting a porous matrix,
B. saturating the porous matrix with a homogenous solution comprising certain curable ingredients;
C. removing excess homogenous solution from the saturated porous matrix,
D. stimulating release of free radicals from the free radical initiator thereby initiating a polymerization reaction to form a cross-linked ion-transferring polymer substantially filling the pores and covering the surfaces of the porous matrix thereby forming a membrane,
E. washing the membrane to remove excess solvent, and
F. optionally bathing the washed membrane in a sodium chloride solution to selectively cross-link sodium or chloride ions to and within the ion-transferring polymer.

Practical problems encountered in the production of ionically-charged membranes include how to provide good mechanical strength, good selectivity and low water-permeability. Furthermore, membrane users require the lowest prices possible, which means that the production methods and components required to make the ionically-charged membranes are ideally inexpensive.

According to a first aspect of the present invention there is provided a method for preparing an ionically-charged membrane comprising the steps:
(1) applying a film of curable composition to a support;
(2) curing the film of curable composition to give an ionically-charged membrane; and
(3) removing the ionically-charged membrane from the support;
wherein the curable composition comprises:
a) 5 to 50 wt % of curable compound comprising one ethylenically unsaturated group and an ionic group;
b) 10 to 70 wt % of crosslinking agent comprising at least two ethylenically unsaturated groups and having a molecular weight of at least 500 dalton per ethylenically unsaturated group; and
c) 5 to 60 wt % of inert solvent.

In this specification (including its claims), the verb "comprise" and its conjugations are used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one".

The amount (wt %) refers to the total amount of the defined component(s) present in the composition. For example, the composition may contain more than one of a defined component, in which case the defined amount (wt %) is the total amount of all of such components present in the composition.

Before applying the composition to the surface of the support, the support may be subjected to a corona discharge treatment, plasma glow discharge treatment, flame treatment, ultraviolet light irradiation treatment, chemical treatment or the like, e.g. for the purpose of improving its wettability.

While it is possible to prepare the membrane on a batch basis using a stationary support, to gain full advantage of the invention it is much preferred to prepare the membrane on a continuous basis using a moving support. The support may be in the form of a roll which is unwound continuously or the support may be a continuously driven belt (or a combination of these methods). Using such techniques the film can be applied to the support on a continuous basis or it can be applied on a large batch basis.

The film of curable composition may be applied to the support by any suitable method, for example by curtain coating, blade coating, air-knife coating, knife-over-roll coating, slide coating, slot die coating, nip roll coating, forward roll coating, reverse roll coating, micro-roll coating, dip coating, foulard coating, kiss coating, rod bar coating or spray coating. The coating of multiple layers can be done simultaneously or consecutively. For simultaneous coating of multiple layers, curtain coating, slide coating and slot die coating are preferred.

Thus in a preferred method, the film is applied continuously to a moving support, more preferably by means of a manufacturing unit comprising one or more composition application station(s), one or more irradiation source(s) for curing the composition, a membrane collecting station and a means for moving the support from the composition application station(s) to the irradiation source(s) and to the membrane collecting station.

The composition application station(s) may be located at an upstream position relative to the irradiation source(s) and the irradiation source(s) is/are located at an upstream position relative to the membrane collecting station.

In one embodiment step (1) comprises sandwiching the composition between two supports which may be identical or different.

Optionally the method further comprises the step of including a porous (woven or non-woven) strengthening material in the film of curable composition. The method of the present invention has the advantage over composite membranes of the prior art that a wide scope of strengthening materials can be used, including extruded nets and other cheap porous materials, on which much less demands are made when compared to the strengthening materials typically used in composite membranes of the prior art. Thus one may use highly porous materials as the strengthening material. Alternatively the film of curable composition which is cured in step (2) is free from strengthening materials, in which case the resultant membrane is a so-called 'free film' membrane and such a membrane has the advantage of being cheaper than a membrane containing a strengthening material.

In order to produce a sufficiently flowable curable composition for application by a high speed coating machine, it is preferred that the composition has a viscosity below 12,000 mPa·s when measured at 50° C., more preferably from 1 to 4,000 mPa·s when measured at 50° C. Most preferably the viscosity of the curable composition is from 2 to 500 mPa·s when measured at 50° C. For coating methods such as slide bead coating the preferred viscosity is from 2 to 150 mPa·s when measured at 50° C.

With suitable coating techniques, the curable composition may be applied to a support moving at a speed of over 5 m/min, preferably over 10 m/min, more preferably over 15 m/min, e.g. more than 20 m/min, or even higher speeds, such as 30 m/min, or up to 100 m/min can be reached.

The film of curable composition applied to the support preferably has a wet thickness of 10 to 1000 μm, especially 20 to 400 μm.

Preferred supports are non-porous (so that step (3) is possible). Examples of non-porous supports include metals (e.g. aluminium, copper and stainless steel), polymers (e.g. polyethylene, polypropylene, polyvinylchloride, polyethylene terephthalate, polyether ether ketone, polytetrafluoroethylene, polyethylene naphthalate and silicone rubber) and combinations thereof (e.g. polymer-coated metal sheets). The polymers may be strengthened by woven or non-woven substrates (e.g. fibreglass, metal mesh or the like).

In a preferred embodiment the support is transparent to the electromagnetic radiation used for step (2).

Curing is preferably performed by radical polymerisation, preferably using electromagnetic radiation. The curing is preferably achieved thermally (e.g. by irradiating with infrared light) or, more preferably, by irradiating the composition with ultraviolet light or an electron beam. The source of radiation may be any source which provides the wavelength and intensity of radiation necessary to cure the composition. A typical example of a UV light source for curing is a D-bulb with an output of 600 Watts/inch (240 W/cm) as supplied by Fusion UV Systems. Alternatives are the V-bulb and the H-bulb from the same supplier. When no photoinitiator is included in the composition, the film of curable composition (often abbreviated hereafter to just "the composition") can be cured by electron-beam exposure, e.g. using an exposure of 50 to 300 keV. Curing can also be achieved by plasma or corona exposure or by a combination of methods described above.

During curing the components a) and b) (and any other curable components which may be present) polymerise to form an ionically-charged membrane. If desired further curing may be applied subsequently to finish off, although generally this is not necessary.

For thermal curing the composition preferably comprises one or more thermally reactive free radical initiators, preferably being present in an amount of 0.01 to 5 parts per 100 parts of the curable composition, wherein all parts are by weight.

Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. α,α'-azobisisobutyronitrile and/or γ,γ'-azobis(γ-cyanovaleric acid); persulfates; peracetates, e.g. methyl peracetate and/or tert-butyl peracetate; peroxalates, e.g. dimethyl peroxalate and/or di(tert-butyl) peroxalate; disulfides, e.g. dimethyl thiuramdisulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably curing of the composition begins within 3 minutes, more preferably within 60 seconds, of the composition being applied to the support.

Preferably the curing is achieved by irradiating the composition for less than 30 seconds, more preferably less than 10 seconds, especially less than 3 seconds, more especially less than 2 seconds. In a continuous method the irradiation occurs continuously and the speed at which the composition moves through the beam of irradiation is mainly what determines the time period of curing.

Preferably the curing uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photo-initiator included in the curable composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm², more preferably between 40 and 1500 mJ/cm², most preferably between 70 and 900 mJ/cm² as measured by a High Energy UV Radiometer (UV PowerMap™ from EIT, Inc) in the UV-A and UV-B range indicated by the apparatus. Exposure times can be chosen freely but preferably are short and are typically less than 10 seconds, more preferably less than 5 seconds, especially less than 3 seconds, more especially less than 2 seconds, e.g. between 0.1 and 1 second.

To reach the desired exposure dose at high coating speeds, more than one UV lamp may be used, so that the composition is irradiated more than once. When two or more lamps are used, all lamps may give an equal dose or each lamp may have an individual setting. For instance the first lamp may give a higher dose than the second and following lamps or the exposure intensity of the first lamp may be lower. Varying the exposure dose of each lamp may influence the polymer matrix structure and the final crosslink density. In a preferred embodiment the composition is cured by simultaneous irradiation from opposite sides using two or more irradiation sources, e.g. two lamps (one at each side). The two or more irradiation sources preferably irradiate the composition with the same intensity as each other. By using this symmetric configuration, a higher crosslinking efficiency can be achieved and curling of the membrane can be reduced or prevented.

Curing is preferably performed at between 20 and 60° C. While higher temperatures may be used, these are not preferred because they can lead to higher manufacturing costs.

The present method allows the preparation of membranes having a desirable degree of flexibility, without being overly flexible or too rigid. The compositions can provide thin membranes with low numbers of defects, low tendency to curl while retaining good durability in use.

The ionically-charged membrane may be removed from the support by any suitable means, e.g. by peeling the ionically-charged membrane from the support.

In contrast to prior methods where a curable composition soaks into a porous support and is then cured to give a composite membrane, the present method can be performed such that the ionically-charged charged membrane can be removed from the support. As a consequence the method of the present invention results in cost savings because the same support can be used multiple times to prepare multiple membranes.

Surprisingly the present method, where the ionically-charged membrane is removed from the support and is free from strengthening material, results in membranes having higher permselectivity and a lower electrical resistance than the case when the curable composition is applied to a porous support to give a composite membrane.

The method of the present invention may contain further steps if desired, for example washing and/or drying the resultant membrane.

As examples of ethylenically unsaturated groups there may be mentioned vinyl groups, methacrylic groups and acrylic groups.

Preferred acrylic ($H_2C=CHCO-$) groups are acrylate ($H_2C=CHCO_2-$) and acrylamide ($H_2C=CHCONH-$) groups. Preferred methacrylic ($H_2C=C(CH_3)CO-$) groups are methacrylate ($H_2C=C(CH_3)CO_2-$) and methacrylamide ($H_2C=C(CH_3)CONH-$) groups.

Component a) has one (i.e. only one and not more than one) ethylenically unsaturated group. Component a) has at least one ionic group, e.g. at least one anionic group and/or at least one cationic group.

Preferred anionic groups are sulpho, carboxy and phosphato groups and they may be in the free acid form or partially or wholly in salt form. The preferred salts are lithium, ammonium, sodium and potassium salts and mixtures comprising two or more thereof. Preferred anionic groups are in the free acid form. Especially preferred anionic groups are sulpho groups.

Examples of curable compounds comprising one ethylenically unsaturated group and an anionic group include acrylic acid, beta carboxy ethyl acrylic acid, maleic acid, maleic acid anhydride, vinyl sulphonic acid, phosphonomethylated acrylamide, (2-carboxyethyl)acrylamide and especially 2-(meth)acrylamido-2-methylpropanesulfonic acid (and salts of the foregoing).

The preferred cationic group comprises a quaternary ammonium group.

Examples of curable compounds comprising one ethylenically unsaturated group and a cationic group include (3-acrylamidopropyl)trimethylammonium salt, 3-methacrylamidopropyl trimethyl ammonium salt, (ar-vinylbenzyl) trimethylammonium salt, (2-(methacryloyloxy)ethyl)trimethylammonium salt, [3-(methacryloylamino)propyl]trimethyl ammonium salt, (2-acrylamido-2-methylpropyl) trimethylammonium salt, 3-acrylamido-3-methylbutyl trimethyl ammonium salt, acryloylamino-2-hydroxypropyl trimethyl ammonium salt, N-(2-aminoethyl)acrylamide trimethyl ammonium salt and mixtures comprising two or more thereof.

Component a) may comprise one or more than one curable compound comprising one ethylenically unsaturated group and an ionic group. Preferably the curable compound comprising one ethylenically unsaturated group and an ionic group has a molecular weight of less than 1000 dalton, more preferably less than 500 dalton.

The ethylenically unsaturated group present in component a) is preferably an acrylic group, more preferably an acrylamide group.

The curable compound comprising one ethylenically unsaturated group and an ionic group is preferably present in an amount of at least 6 wt %, more preferably at least 8 wt % and especially at least 10 wt %. The curable compound comprising one ethylenically unsaturated group and an ionic group is preferably present in an amount of less than 45 wt %, more preferably less than 40 wt %.

The crosslinking agent of component b) comprising at least two ethylenically unsaturated groups has a molecular weight of at least 500 dalton per ethylenically unsaturated group, for example a crosslinking agent comprising two acrylic groups has a molecular weight of at least 1000 and a crosslinking agent comprising three acrylic groups has a molecular weight of at least 1500. The molecular weight ("MWT") is the number average molecular weight (NAMW). Preferably the crosslinking agent of component b) has a MWT of at least 700 dalton per ethylenically unsaturated group. Suitable methods to determine the MWT of component b) include Matrix Assisted Laser Desorption Ionization Time-of-Flight Mass Spectrometry (MALDI-TOF MS), Gel Permeation Chromatography (GPC), Size Exclusion Chromatography (SEC), Gel Permeation Chromatography-Nuclear Magnetic Resonance (GPC-NMR), static light scattering (SLS) and combinations thereof. The most preferred method is MALDI-TOF MS.

Preferably each crosslinking agent used as component b) has a MWT below 10,000 dalton, more preferably below 8,000 dalton. Preferably each crosslinking agent used as component b) has a molecular weight of at least 1000 dalton, more preferably at least 1400 dalton.

While not wishing to be bound by any particular theory, it is believed that the MWT per ethylenically unsaturated group required by the present invention can provide the resultant membrane with improved flexibility, enabling the membrane to absorb mechanical stress. This is believed to be particularly valuable for membranes which lack a strengthening material.

The ethylenically unsaturated groups present in component b) are preferably acrylic groups, i.e. acrylate or acrylamide groups. The acrylic groups present in component b) may be identical to each other, different from each other or some may be the same and others different. For example, the acrylic groups may all be acrylate groups or they may all be acrylamide groups. Alternatively the acrylic groups may comprise at least acrylate group and one or more acrylamide groups. In a preferred embodiment, all of the acrylic groups in component b) are acrylamide groups or all of the acrylic groups in component b) are acrylate groups. Component b) preferably has two, three or four acrylic groups, especially two or three acrylic groups. Preferred acrylic groups are acrylamide groups because they are particularly stable against hydrolysis.

The composition optionally comprises more than one crosslinking agent, for example the composition may comprise more than a crosslinking agent having two or more ethylenically unsaturated groups (e.g. acrylic groups) and having a molecular weight of at least 500 dalton per ethylenically unsaturated group. Alternatively the composition may comprise a further crosslinking agent having at least two ethylenically unsaturated groups and having a molecular weight below 500 dalton per ethylenically unsaturated group in addition to component b). This further crosslinking agent preferably has a melting point below 80° C. and may function as a reactive diluent, i.e. is liquid at the processing temperature.

In a preferred embodiment, component b) has a solubility in water of less than 0.01 mol/l, especially less than 0.001 mol/l, when measured at 25° C. The solubility of component b) in water may be measured by a shaking flask method or by determining the octanol water partition coefficient. For poorly soluble compounds the solubility in water is preferably measured using the octanol water partition coefficient. Solubility may be measured according to the method described by Jain et al, J. Pharm. Sc., 90, 2, 2001, 234-252, wherein the octanol-water partition coefficient may be determined using the general method described in the OECD guidelines for the testing of chemicals no. 117: 'Partition Coefficient (n-octanol/water), High Performance Liquid Chromatograph (HPLC) Method', adopted 13 Apr. 2004. The aforementioned low water-solubilities are preferred because they can lead to membranes that exhibit low swelling on contact with water and which have good resistance to hydrolysis.

The swelling of the resultant membrane when soaked in water is preferably less than 120%, more preferably less than 100%, especially less than 80%.

Examples of suitable crosslinking agents which may be used as component b) include di-, tri- and polyfunctional aliphatic and aromatic acrylate oligomers including urethane, polyester and epoxy type oligomers, such as oligomers from Sartomer and Soltech Ltd, in each case having the above mentioned MWT. Specific examples of suitable commercially available crosslinking agent(s) which may be used as component b) include CN2003EU epoxy diacrylate of MWT 3,000), CNUVE150/80 (diacrylate of MWT 4,000), CNUVE151M (diacrylate of MWT 4,000), CN790 (acrylated polyester of MWT 5,000), CN9143 (aromatic urethane diacrylate of MWT 3,800), CN9761 (diacrylate of MWT 2,700), CN9170 (diacrylate of MWT 5,000), CN970 (triacrylate of MWT 2,600), CN9761 (diacrylate of MWT 2,700), CN9001 (aliphatic urethane diacrylate of MWT 3,250), CN9002 (diacrylate of MWT 7,650), CN9012 (diacrylate of MWT 3,000), CN910 (diacrylate of MWT 3,600), CN936 (diacrylate of MWT 4,000), CN956 (diacrylate of MWT 3,600), CN962 (diacrylate of MWT 5,550), CN964 (diacrylate of MWT 3,700), CN965 (diacrylate of MWT 5,600), CN966 (diacrylate of MWT 7,000), CN981 (diacrylate of MWT 2,200), CN 991 (diacrylate of MWT 1,500), CN996 (diacrylate of MWT 2,850), and CN998 (aliphatic urethane triacrylate of MWT 2,200) all available from Sartomer. Further crosslinking agent(s) which may be used as component b) are commercially available from Soltech Ltd., e.g. SU500, SU514, SU5225, SU530, SU704, SU710 and SU7206. Especially preferred are the diacrylamide and triacrylamide versions of the compounds mentioned above.

Optionally component b) has an anionic group. Preferably, however, component b) is free from ionic groups, e.g. free from anionic (e.g. sulpho, carboxy or phosphato) and cationic (e.g. quaternary ammonium) groups.

Component b) is preferably present in an amount of at least 12 wt %, more preferably at least 15 wt % and especially at least 20 wt %. Component b) is preferably present in an amount of less than 60 wt %, especially less than 55 wt %.

For the avoidance of doubt, except where specified otherwise, wt % figures are relative to the total weight of the composition (e.g. (weight of component/weight of composition)×100%).

Preferably the molar ratio of component b) to a) is at least 0.05, e.g. between 0.05 and 1.0, more preferably at least 0.10, e.g. 0.10 to 0.6.

The inert solvent, component c), can lower the viscosity and/or surface tension of the composition and make it more suitable for curing in high-speed, continuous manufacturing methods. The inert solvent can act as a non-reactive diluent for the other components of the composition.

As is understood in the art, "inert" means the relevant component is not capable of polymerising with component a) or b), e.g. it lacks ethylenically unsaturated groups.

Component c) can also be useful for providing a homogenous solution of all the components of the composition.

Component c) preferably is or comprises an organic solvent.

Preferred organic solvents include $C_{1-4}$-alcohols (e.g. methanol, ethanol, 2-methoxyethanol, propan-1-ol and propan-2-ol), diols (e.g. ethylene glycol and propylene glycol), triols (e.g. glycerol), carbonates (e.g. ethylene carbonate, propylene carbonate, dimethyl carbonate, diethyl carbonate, di-t-butyl dicarbonate and glycerin carbonate), $C_{1-4}$-ethers (e.g. tetrahydrofuran, 1,4-dioxane, dimethylether, diethylether and methylethylether), $C_{1-4}$-esters (e.g. ethylacetate), $C_3$-$C_4$ ketones (e.g. acetone and methylethyl ketone), acetonitrile, dimethyl sulphoxide and mixtures comprising two or more thereof.

Preferably component c) has a boiling point of 100° C. or less at atmospheric pressure. Particularly preferred organic solvents are methanol, acetone, propan-2-ol and compositions comprising two or more thereof.

The inert solvent c) is preferably present in an amount of at least 6 wt %, more preferably at least 8 wt % and especially at least 10 wt %. The inert solvent is preferably present in an amount of up to 50 wt %, more preferably up to 40 wt % and especially up to 35 wt %. For example, the inert solvent c) is preferably present in an amount of 6 to 50 wt %, more preferably 8 to 40 wt % and especially 10 to 35 wt %.

The organic solvent is optionally a single organic solvent or a combination of two or more organic solvents.

Preferably the inert solvent c) is not an organic compound which can form a salt with component a) and is incapable of polymerising with component a) or b) under the condition used for the method. Component c) is preferably free from tertiary amine groups.

The composition preferably comprises sufficient component c) to ensure that components a) and b) are completely dissolved.

Optionally the composition further comprises d) an organic compound which can form a salt with component a). Thus when the ionic group in component a) is anionic then optional component d) is preferably an organic base (more preferably an organic amine) and when the ionic group in component a) is cationic then optional component d) is preferably an organic acid anion.

Preferred organic amines include tertiary amines e.g. tri($C_{1-12}$-alkyl)amines and N-alkylated heterocyclic tertiary amines.

Preferred tri($C_{1-12}$-alkyl)amines include trimethylamine, triethylamine, tripropyl amine, tributylamine, triethanolamine, trihexylamine, dimethyl isopropylamine, N—N-diethyl-tert-octylamine, trioctylamine, dodecyldimethylamine, dodecyldibutylamine, dodecylmethylbenzylamine, tetradecylethylaniline, hexadecyldioxethylamine, 1-[bis[3-(dimethylamino)propyl]amino]-2-propanol, dimethyl isopropylamine, tris[2-(2-methoxyethoxy)ethyl]-amine, dimethylhexylamine, dimethyl cylochexylamine, dimethyl benzylamine, N—N—N'—N'-tetrakis(2-hydroxypropyl)-ethylenediamine, N, N, N',N'-tetramethyl-1,6-hexanediamine, N, N, N',N'-tetramethyl-1,4-butanediamine, N, N, N',N'-tetraethyl-1,3-propanediamine, N, N, N',N",N"-pentamethyldiethylenetriamine, 2-[2-(dimethylamino)ethoxy] ethanol, N-methoxymethyl-diethylamine and tris[2-(2-methoxyethoxy)ethyl]amine).

Preferred heterocyclic tertiary amines include 1,4,8,11-tetramethyl-1,4,8,11-tetraazacyclotetradecane (mpt 38-42° C.); Dabco® 33-LV; N—($C_{1-12}$alkyl) imidazoles (e.g. 1-methylimidazole, 1-ethylimidazole, 1-butylimidazole and 1-(3-aminopropyl)imidazole); N—($C_{1-12}$-alkyl) piperidines (e.g. 1-methyl piperidine, 1-ethyl piperidine and 1-(2-aminoethyl)piperidine); N—($C_{1-12}$-alkyl) pyrroles (e.g. 1-methylpyrrole, 1-ethylpyrrole and 1-butylpyrrole); N—($C_{1-12}$-alkyl) pyrrolidines (e.g. 1-methylpyrrolidine and 1-(2-hydroxyethyl)pyrrolidine), N—($C_{1-12}$-alkyl) indoles (e.g. 1-methylindole, 1-ethylindole and 1-propylindole); tri N—($C_{1-12}$-alkyl) triazines (e.g. 1,3,5-trimethylhexahydro-1, 3,5-triazine); N—($C_{1-12}$-alkyl) morpholines (e.g. N-methylmorpholine, 3-aminopropyl morpholine and 4-(2-hydroxyethyl)morpholine) and N—($C_{1-12}$-alkyl) piperazines (e.g. 1-methylpiperazine, 1-ethylpiperazine, 1,4-dimethylpiperazine and 1,4-bis(2-hydroxyethyl)piperazine).

The tri($C_{1-12}$-alkyl)amines and heterocyclic tertiary amines may contain further substitutents in addition to the tertiary amine group(s), e.g. groups selected from amino, aminoalkyl (e.g. $C_{1-4}$-alkylene-N-di($C_{1-8}$-alkyl), hydroxy, alkoxy (e.g. $C_{1-4}$-alkoxy) and phenyl.

Preferably the tertiary amine has a molecular weight of less than 1000 dalton, more preferably less than 500 dalton.

Preferred organic acid anions include organic carboxylic acid anions, e.g. formate, acetate and oxalate, alkylsulphonates, e.g. ethanesulfonate and propanesulphonate, perfluoroalkylsulphonates, borates, e.g. tetraphenylborate, (fluoroalkyl)borates, e.g. tetrakis(3,5-bis(trifluoromethyl)phenyl) borate and alkoxytris(fluoroalkyl)borate, bis (trifluoromethane)sulfonimide (bistriflimide), trifluoromethanesulfonate (triflate), nonafluorobutane sulfonate (nonaflate), tosylate, tris(pentafluoroethyl)trifluorophosphate, bis(trifluoromethylsulfonyl)imide, bis[bis(pentafluoroethyl)phosphinyl]imide and (bis(2-2-ethyl hexyl) sulfosuccinate. The organic acid anion preferably has a molecular weight of less than 1000 dalton, more preferably less than 500 dalton.

Preferably component d) has a melting point at atmospheric pressure of 50° C. or lower. Preferably the identity, amounts and relative ratios of component a) and component d) are such that a mixture consisting of component a) and d) in the ratio used in the composition would have a melting point at atmospheric pressure of 50° C. or lower.

Component d) is preferably present in about an equimolar amount relative to the number of charged groups in component a). Typically the amount of component d) included in the composition is within 20 mol %, especially within 10 mol %, of the amount necessary to neutralise all oppositely charged curable components of the composition.

Preferably component d) is inert (i.e. not polymerisable under the conditions used to perform the method).

Preferably component d) comprises 1 to 3 tertiary organic amines or 1 to 3 organic acid anions.

When the composition is free from radical initiator it may be cured using electron beam radiation.

Preferably, however, the composition comprises e) 0.01 to 10 wt %, more preferably 0.05 to 5 wt %, especially 0.1 to 2 wt % radical initiator, relative to the weight of the composition. The preferred radical initiator is a photoinitiator.

The radical initiator is often referred to as component e) in this specification.

The curable composition may comprise one or more than one radical initiator as component e).

When the composition comprises an acrylamide, diacrylamide, or higher-acrylamide, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-) phenylpropan-1-one, and acylphosphine oxides, e.g. 2,4,6-trimethylbenzoyl-diphenylphosphine oxide, ethyl(2,4,6)-trimethylbenzoyl)-phenyl phosphinate and bis(2,4,6-trimethylbenzoyl)-phenylphosphine oxide.

When a radical initiator is present in the composition, preferably a polymerization inhibitor is also included (e.g. in an amount of below 2 wt %). This is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine) aluminum salt, Omnistab™ IN 510, Genorad™ polymerisation inhibitors and mixtures comprising two or more of the foregoing.

In one embodiment the composition comprises less than 10 wt %, more preferably less than 5 wt %, of ethylenically unsaturated compounds which are free from ionic groups and have one (i.e. only one) ethylenically unsaturated group.

Where desired, a surfactant or combination of surfactants may be included in the composition, e.g. to act as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations comprising two or more thereof. Preferred surfactants are as described in WO 2007/018425, page 20, line 15 to page 22, line 6, which are incorporated herein by reference thereto.

Preferably the composition has a pH of 0 to 11.

The pH of the composition depends to some extent on whether the ionic group is in salt form. When the ionic group is an anionic group partly in the free acid form the composition preferably has a pH of 0.2 to 7, more preferably 0.5 to 2.5.

The composition optionally further comprises a rheology modifier. Preferred rheology modifiers include inorganic particles, e.g. clay, silica and/or calcium carbonate. Including a rheology modifier can enable the viscosity of the composition to increase without reducing the crosslinking reaction rate, in contrast to the alternative method of increasing viscosity by reducing the amount of inert solvent which can slow the reaction rate. The presence of a rheology modifier also enables fast mixing of ingredients. The curable composition preferably comprises 0.1 to 5 wt % of rheology modifiers, relative to the weight of the composition.

The curable composition may contain other components, for example acids, pH controllers, preservatives, viscosity modifiers, stabilisers, dispersing agents, antifoam agents, monomers free from anionic groups, organic/inorganic salts, anionic, cationic, non-ionic and/or amphoteric surfactants and the like.

Preferably the composition is free from, or substantially free from, methacrylic compounds (e.g. methacrylate and methacrylamide compounds), i.e. the composition comprises at most 10 wt % of compounds comprising one or more methacrylic groups.

Preferably the composition is free from, or substantially free from, divinyl benzene and derivatives thereof.

Preferably the composition is free from, or substantially free from, styrene and derivatives thereof.

Preferably the composition is free from, or substantially free from, metal salts, e.g. free from lithium nitrate, lithium hydroxide and calcium nitrate.

Preferably the composition is free from, or substantially free from, dyes and pigments. This is because there is no need to include dyes or pigments in the composition.

Substantially free from means less than 10 wt %, preferably less than 5 wt % of the compound, more preferably less than 1 wt %.

Thus the preferred composition is free from, or substantially free from, divinyl benzene, dyes, pigments, styrene, methacrylic compounds and metal salts.

The curable composition may of course contain further components not specifically mentioned or excluded above.

In view of the foregoing, the curable composition preferably comprises
a) 8 to 40 wt % of curable compound comprising one ethylenically unsaturated group and a cationic or anionic group;
b) 15 to 60 crosslinking agent comprising at least two acrylic groups and having a molecular weight of at least 500 dalton per acrylic group;
c) 8 to 40 wt % inert solvent;
d) an organic compound which can form a salt with component a); and
e) 0.05 to 5 wt % radical initiator.

In this preferred composition, the molar ratio of component b) to a) is preferably at least 0.05, e.g. 0.05 to 1.0, more preferably at least 0.10, e.g. 0.10 to 0.6 and/or the molar ratio of component d) to the total number of cationic and anionic groups in component a) is preferably at least 0.8, e.g. 0.8 to 1.2, more preferably 0.9 to 1.1. A further preference is that the amount of component c) is 10 to 35 wt %.

According to a second aspect of the present invention there is provided a curable composition as defined in relation to the first aspect of the present invention and with the preferences described above.

The composition according to a second aspect of the present invention can be used to prepare membranes by the method described in the first aspect of the invention.

The composition according to a second aspect of the present invention may also be used to prepare a composite membrane, e.g. a membrane comprising a porous strengthening material and a polymer obtained by curing the composition according to the second aspect of the present invention.

One preferred method for making a composite membrane comprises:
(1) applying a film of curable composition according to a second aspect of the present invention to a non-porous support;
(2) contacting the curable composition present on the non-porous support with a porous strengthening material to give a laminate comprising the film containing the strengthening material and the curable composition and a non-porous support which is not impregnated with the curable composition;
(3) curing the composition present on the non-porous support to give a laminate comprising a composite membrane and the non-porous support; and
(4) removing the non-porous support from the composite membrane.

Another preferred method for making a composite membrane comprises the steps:
(1) applying the curable composition according to a second aspect of the present invention to a porous strengthening material to give a strengthening material impregnated with the composition;
(2) optionally sandwiching the strengthening material comprising the composition between non-porous supports to give a laminate;
(3) curing the composition to give a composite membrane; and
(4) if the strengthening material has been sandwiched between non-porous supports to give a laminate, removing one or both of the non-porous supports from the composite membrane.

Preferably the components of the composition are selected such that no phase separation occurs during the curing step. In this way, the likelihood of a porous structure in the resultant membrane is reduced.

Hitherto membranes have often been made in slow and energy intensive methods, often having many stages. The present invention enables the manufacture of membranes in a simple method that may be run continuously for long periods of time to mass produce membranes relatively cheaply. Step (3) of the method of the first aspect of the present invention means that the support can be re-used, resulting in significant cost savings compared to methods for making composite membranes where the support is porous and is permanently attached to the cured composition.

Surprisingly by using the presently claimed composition one can produce membranes which are strong even without a porous support.

The thickness of the membrane is preferably less than 500 µm, more preferably between 10 and 500 µm, most preferably between 20 and 200 µm.

Preferably the membrane has a calculated ion exchange capacity ("IEC") of at least 0.1 meq/g, more preferably of at least 0.3 meq/g, especially more than 0.6 meq/g, more especially more than 1.0 meq/g, particularly more than 3.5 meq/g of total dry weight of the composition. IEC's towards the upper end of these ranges are preferred in order to reduce the electrical resistance of the resultant membrane. The resultant IEC is expressed as milli-equivalents per gram of dry (i.e. solvent-free) composition (meq/g). Any solvents present in the composition, including any non-curable diluents or waters of crystallisation present in any ingredient used to make the composition, are therefore excluded from the calculation of IEC.

Preferably the membrane has a permselectivity for small cations (e.g. $Na^+$ or $Cr$) of more than 85%, more preferably more than 87.5%, especially more than 90% and more especially more than 93%.

Preferably the membrane has an electrical resistance less than 15 ohm·$cm^2$, most preferably less than 10 ohm·$cm^2$. The electrical resistance may be determined by the method described below in the examples section.

Preferably the membrane exhibits a % weight loss when ultrasonicated for 99 minutes and broken-off parts of the membrane are removed, of less than 3%, more preferably less than 1%. The % weight loss can be controlled by, for example, selecting appropriate amounts of components a) and b) and by adjusting appropriate parameters in the curing step.

Electrical resistance and permselectivity may be measured by the methods described by Dlugolecki et al, J. of Membrane Science, 319 (2008) on pages 217-218.

Typically the ionically-charged membrane is substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 2 nm, preferably smaller than 1 nm.

The membrane preferably has a low water permeability so that ions may pass through the membrane and water molecules do not pass through the membrane or pass through the membrane only to a small extent. Preferably the membrane's water permeability is lower than $50\times10^{-12}$ $m^3/m^2 \cdot s \cdot kPa$, more preferably lower than $25\times10^{-12}$ $m^3/m^2 \cdot s \cdot kPa$, especially lower than $20\times10^{-12}$ $m^3/m^2 \cdot s \cdot kPa$. The requirements for water permeability depend on the intended use of the membrane.

The network structure of the membrane is determined to a large extent by the identity of the crosslinking agent(s) and the curable compound and their functionality, e.g. the number of crosslinkable groups they contain per molecule.

During application of the composition to the support, the composition may form a film on top of the support, or in the abovementioned alternative method for making a composite membrane it may permeate wholly or partially into the pores of a strengthening material thereby forming an impregnated composite membrane after curing.

For the method of the first aspect of the present invention, the composition (when cured) must be removable from the support hence the curable composition should not be allowed to permeate into the support to an extent that would prevent it's removal from the support when cured (e.g. so that one may re-use the non-porous support).

In the abovementioned method for making a composite membrane the curable composition may be applied to both sides of a strengthening material to achieve a symmetrical composite membrane.

According to a third aspect of the present invention there is provided a membrane obtained by a method according to the first aspect of the present invention or by the abovementioned alternative embodiment in which the curable composition permeates wholly or partially into the pores of a strengthening material thereby forming a composite membrane after curing.

The membranes according to the third aspect of the present invention may also be put to other uses requiring membranes having ionic groups.

The membranes according to the third aspect of the present invention preferably have the properties described above in relation to the second aspect of the present invention.

According to a fourth aspect of the present invention there is provided use of a membrane according to the third aspect of the present invention for the separation or purification of liquids, vapours or gases or for the generation of energy.

The membranes of the invention are particularly useful for water purification, the treatment of blowdown water in cooling tower systems and/or the generation of electricity etc. for example in ED, (C)EDI, EDR, FTC, ZLD, ZDD or RED, although they may also be used for other purposes.

According to a fifth aspect of the present invention there is provided an electrodialysis or reverse electrodialysis unit comprising one or more membranes according to the present invention.

Preferably the electrodialysis or reverse electrodialysis unit or the electrodeionization module comprises at least one anode, at least one cathode and one or more membranes according to the third aspect of the present invention. Preferred RED units further comprises an inlet for providing a flow of water having a relatively high salt content along a first side of a membrane according to the present invention and an inlet for providing a flow of water having a relatively low salt content along a second side of the membrane such that ions pass from the first side to the second side of the membrane. Preferably the one or more membranes of the RED unit comprise a membrane according to the first or third aspect of the present invention having anionic groups and a further membrane having cationic groups.

In a preferred embodiment the unit comprises at least 3, more preferably at least 5, e.g. 36, 64 or up to 500 or even 1000, membranes according to the first or third aspect of the present invention, the number of membranes being dependent on the application. The membrane may for instance be used in a plate-and-frame or stacked-disk configuration or in a spiral-wound design. Alternatively, a continuous first membrane according to the present invention having anionic groups may be folded in a concertina (or zigzag) manner and a second membrane having cationic groups (i.e. of opposite charge to the first membrane) may be inserted between the folds to form a plurality of channels along which fluid may pass and having alternate anionic and cationic membranes as side walls.

The invention will now be illustrated with non-limiting examples where all parts and percentages are by weight unless specified otherwise.

In the examples the following properties were measured by the methods described below.
General Test Methods In Table 3 below, the suffix "unsupp" refers to the properties of a membrane made according to the first aspect in which the ionically-charged membrane is separated from the support. For comparison purposes, the suffix "supp" refers to the properties of the corresponding composite membranes comprising a porous nonwoven support.

Permselectivity ("α (%)") was measured by using a static membrane potential measurement. Two cells were separated by the membrane under investigation. Prior to the measurement the membrane was equilibrated in a 0.1 M NaCl solution for at least 12 hours. Two streams having different NaCl concentrations were passed through cells on opposite sides of the membranes under investigation. One stream had a concentration of 0.1M NaCl (from Sigma Aldrich, min. 99.5% purity) and the other stream was 0.5 M NaCl. The flow rate of both streams was 0.90 dm³/min. Two Calomel reference electrodes (from Metrohm AG, Switzerland) were connected to Haber-Luggin capillary tubes that were inserted in each cell and were used to measure the potential difference over the membrane. The effective membrane area was 3.14 cm² and the temperature was 21° C.

When a steady state was reached, the membrane potential was measured ($\Delta V_{meas}$).

The permselectivity (α (%)) of the membrane was calculated according the formula:

$$\alpha(\%) = \Delta V_{meas} - \Delta V_{theor} * 100\%.$$

The theoretical membrane potential ($\Delta V_{theor}$) is the potential for a 100% permselective membrane as calculated using the Nernst equation.

The Water-permeability (WP) was determined by performing the calculation described below in Formula (1) below:

$$WP = WP_u + CF \quad \text{Formula (1)}$$

wherein:
 $WP_u$ is the uncorrected water-permeability of the membrane in m³/m²·s·kPa, calculated using Formula (2) below; and
 CF is the correction factor in m³/m²·s·kPa to take account of electro-osmosis and ion transportation through the membrane, calculated using Formula (3) below.

$WP_u$ was calculated using Formula (2) as follows:

$$WP_u = (\Delta W/(SA \times Time \times D_{H2O} \times P_{os})) \quad \text{Formula (2)}$$

wherein:
 $\Delta W$ is the average change in weight in Mg (n.b. Mg means 1000 Kg) according to the calculation $\Delta W = [(W_{C2} - W_{C1}) + (W_{D2} - W_{D1})] \times 10^{-6}/2$;
 $W_{C1}$ is the start weight of the concentrate in g;
 $W_{C2}$ is the end weight of the concentrate in g;
 $W_{D1}$ is the start weight of the diluate in g;
 $W_{D2}$ is the end weight of the diluate in g; and
 $D_{H2O}$ is the density of water in Mg/m³ (i.e. 1);
 SA is the surface area of the membrane under test in m²;
 Time is the duration of the measurement in seconds; and
 $P_{os}$ is the osmotic pressure in kPa, calculated using Formula (4) below.

The correction factor CF was calculated using Formula (3) as follows:

$$CF = \frac{\left( \begin{array}{c} (M_H \times V_H + M_L \times V_L) \times \\ 10^{-6}/2 \times (MW_{NaCl} + MW_{8H2O}) \end{array} \right)}{(SA \times Time \times D_{H2O} \times P_{os})} \quad \text{Formula (3)}$$

wherein:
 $M_H$ is the change in molar concentration of NaCl in the concentrate in mol/L;
 $V_H$ is the change in volume of the concentrate in liters ("L");
 $M_L$ is the change in molar concentration of NaCl in the diluate in mol/L;
 $V_L$ is the change in volume of the diluate in liters ("L");
 $MW_{NaCl}$ is the molecular weight of the salt being removed (i.e. 58.44 in the case of NaCl);
 $MW_{8H2O}$ is the molecular weight of water being removed with the salt (i.e. 8× (1+1+16) in the case of NaCl=144); and
 SA, Time, $D_{H2O}$ and $P_{os}$ are as hereinbefore defined.

Several of the integers used above were measured as follows:
Measurement of Osmotic Pressure ($P_{os}$)

A membrane sample at least 30×9 cm in size was conditioned for 16 hours in a 0.1 M NaCl (5.843 g/L) solution.

The membrane was clamped between two spacers (PE netting/PES gasket, 290 μm thick, strand distance 0.8 mm, 310×110 mm, effective area 280×80 mm) on either side supported by a PMMA plate each having a cavity of 3 mm deep creating chambers having a volume of 280×80×3 mm on each side of the membrane. The two chambers, together with the membrane separating them, constituted a test cell. The spacer minimized the formation of an electrical double layer. The plates were greased to prevent leakage and fastened to each other by 12 bolts and nuts using a torque of 10 N/m.

Prior to the actual measurement, the chambers were washed with the relevant concentrate and diluate. The concentrate and diluate were then pumped into the chambers either side of the membrane under test via Masterflex PharmaPure tubing using a Masterflex console drive (77521-47) with Easy Load II model 77200-62 gear pumps at a rate of 0.31 L/min. On one side of the membrane the chamber contained 0.7M NaCl (40.91 g/L, i.e. the concentrate) and the chamber on the other side of the membrane contained 0.1 M NaCl (i.e. the diluate). Air was removed by placing the cell in a vertical position. After 5 minutes the pumps are switched in reverse direction and the chambers were emptied. The measurements required to calculate water-permeability of the membrane began by filling the chambers with the concentrate and diluate at a speed of 0.26 L/min, corresponding with about 0.9 cm/s. The concentrate and diluate were circulated through their respective chambers via storage containers for at least 16 hours after which the chambers were emptied again. The start weights ($W_{C1}$ and $W_{D1}$), start densities ($D_{C1}+D_{D1}$), end weights ($W_{C2}$ and $W_{D2}$) and end densities ($D_{C2}+D_{D2}$), of the concentrate and diluate were measured as well as their absolute temperatures and the exact duration of the experiment in hours. From the densities, the molar concentrations of NaCl were calculated according formula:

Molar concentration=(density−0.9985)/0.0403

The osmotic pressure ($P_{os}$) in kPa was then calculated using Formula (4):

$$P_{os} = i \times [((M_{C1}+M_{C2})-(M_{D1}+M_{D2}))/2] \times R \times Temp \quad \text{Formula (4)}$$

wherein:
  i is the van't Hoff factor;
  $M_{C1}$ is the starting molar concentration of the concentrate in mol/m³;
  $M_{C2}$ is the end molar concentration of the concentrate in mol/m³;
  $M_{D1}$ is the starting molar concentration of the diluate in mol/m³;
  $M_{D2}$ is the end molar concentration of the diluate in mol/m³;
  is the gas constant in kPa m³ K⁻¹ mol⁻¹; and
  Temp is the average temperature of the concentrate and diluate in Kelvin during the test.

When the membrane is being used to remove NaCl from water containing NaCl, the van't Hoff factor (i) is 2 because each molecule of NaCl dissociates completely into two ions ($Na^+$ and $Cl^-$). R is 0.008314 kPa m³ K⁻¹.

Electrical resistance ("ER") (ohm·cm²) was measured by the method described by Dlugolecki et al, J. of Membrane Science, 319 (2008) on page 217-218 with the following modifications:
  the auxiliary membranes were CMX and AMX from Tokuyama Soda, Japan;
  a Cole Parmermasterflex console drive (77521-47) with easy load II model 77200-62 gear pumps was used for all compartments;
  the flowrate of each stream was 475 ml/min controlled by Porter Instrument flowmeters (type 150AV-B250-4RVS) and Cole Parmerflowmeters (type G-30217-90);
  the effective area of the membrane was 3.14 cm².

Swelling was measured by a thermal gravimetric analyser TG50 from Mettler. Samples were immersed for at least 1 day in purified water. A small piece of the sample (10-30 mg) was taken out of the water and the excess of water was removed with a tissue. The sample was placed in a TGA-crucible and placed in the TGA-oven. When the balance of the TGA gave a stable signal (red dot disappeared) the start weight was recorded and the TGA measurement was started. Start temperature was 30° C., end temperature was 200° C., rate was 10° C./minute, atmosphere was nitrogen, gas flow was 20 ml/min. After reaching the end temperature the sample was kept at 200° C. for 10 minutes after which the end weight was recorded. All measurements were performed in duplo. The swelling was calculated by dividing the difference between start weight ($m_s$) and end weight ($m_d$) by the end weight according to Formula (5) below:

$$\text{swelling}(wt\ \%) = \frac{m_s - m_d}{m_d} \times 100 \quad \text{Formula (5)}$$

TABLE 1

Ingredients used in the Examples and Comparative Examples:

| Component Category | Abbreviation | identity |
|---|---|---|
| a) | AMPS | 2-acryloylamido-2-methylpropanesulfonic acid |
| b) | CN964 | An aliphatic polyester-based urethane diacrylate oligomer of MWT 3,700 diluted in 15 wt % TPGDA from Sartomer |
|  | CN991 | An aliphatic urethane diacrylate oligomer of MWT 1,500 from Sartomer |

TABLE 1-continued

Ingredients used in the Examples and Comparative Examples:

| Component Category | Abbreviation | identity |
|---|---|---|
|  | CN981 | An aliphatic polyester/polyether based urethane diacrylate oligomer of MWT 2,200 from Sartomer |
|  | CN910 | An aliphatic urethane diacrylate oligomer of MWT 3,600 diluted in 30 wt % TPGDA from Sartomer |
|  | CN2003EU | A modified epoxy diacrylate oligomer of MWT 3,000 from Sartomer |
|  | CNUVE150/80 | A low viscosity, epoxy diacrylate oligomer of MWT 4,000 from Sartomer |
|  | CN996 | An aliphatic urethane diacrylate oligomer of MWT 2,850 from Sartomer |
|  | CN965 | An aliphatic polyester based urethane diacrylate oligomer of MWT 5,600 from Sartomer |
|  | CN998 | An aliphatic urethane triacrylate oligomer of MWT 2,200 diluted in 20 wt % HDDA from Sartomer |
| c) | IPA | propan-2-ol |
|  | MeOH | methanol |
|  | PW | water |
| d) | TEA | triethylamine |
|  | BIm | 1-butylimidazole |
| e) | Darocur™ 1173 | 2-hydroxy-2-methyl-1-phenyl-propan-1-one |
| Other | MBA | N,N-methylene bis(acrylamide) of MWT 154 |
|  | SR399 | Dipentaerythritol pentaacrylate of MWT 525 from Sartomer |
|  | TPGDA | Tripropyleneglycol diacrylate of MWT 300 |
|  | HDDA | 1,6-Hexanediol diacrylate of MWT 226 |
|  | MeHQ | Hydroquinone monomethyl ether, a polymerisation inhibitor from Merck |
|  | LiOH·H₂O | Lithium hydroxide |
|  | Aerosil® 380 | Hydrophilic fumed silica from Evonik. |
|  | Surfactant | polyether siloxane from Evonik. |

Novatexx™ 2226-14E—is a nonwoven polypropylene/polyethylene material from Freudenberg Filtration Technologies.

EXAMPLES 1 TO 11 AND COMPARATIVE EXAMPLES 1 TO 3

Compositions Ex 1 to Ex 11 and comparative compositions CE1 to CE3 were prepared by mixing the ingredients shown in Tables 2 and 3 below at the "temperature for dissolving", wherein amounts are in weight %.

The resultant compositions were applied to an aluminium support as a film of composition using a 150 µm wire wound bar, at a speed of approximately 5 m/m in, by hand. For the supported examples this was followed by application of a non-woven strengthening material (Novatexx™ 2226-14E). The non-woven strengthening material was completely soaked with the composition and subsequently leveled using a 4 micrometer wire wound rod coater.

A membrane was prepared by curing the composition coated on the aluminium support using a Light Hammer LH6 from Fusion UV Systems fitted with a D-bulb working at 100% intensity with a speed of 30 m/min (single pass). The exposure time was 0.47 seconds.

After curing, the membrane was removed from the aluminium support and stored in a 0.1 M NaCl solution for at least 12 hours.

TABLE 2

| Component Category | Component | MWT | CE1 | CE2 | CE3 |
|---|---|---|---|---|---|
| a) | AMPS | 207 | 49.0 | 43.0 | 46.5 |
| c) | PW | | 20.0 | 15.0 | 14.3 |
| | IPA | | 8.0 | 15.7 | 4.9 |
| e) | Darocur™ 1173 | | 0.5 | 0.5 | 0.5 |
| Other | MBA | 154 | 11.6 | 16.2 | 11.0 |
| | SR399 | 525 | 0 | 0 | 12.4 |
| | MEHQ | | 0.1 | 0.1 | 0.1 |
| | LiOH•H$_2$O | | 9.8 | 8.5 | 9.3 |
| | Surfactant | | 1 | 1 | 1 |
| Total | | | 100 | 100 | 100 |
| molar ratio b):a) | | | 0 | 0 | 0 |
| molar ratio d):a) | | | 0 | 0 | 0 |
| Temperature for dissolving | | | 50° C. | 50° C. | 50° C. |
| α (%) | | | 92.6 | 93.6 | 96.1 |
| ER (ohm · cm$^2$) | | | 2.4 | 3.5 | 3.8 |
| Water permeability (×10$^{-12}$ m$^3$/m$^2$ · s · kPa) | | | 39.7 | 29.2 | 26.9 |

In Comparative examples CE1 to CE3 components b) and d) are not present.

TABLE 3

| Component Category | Component | MWT | Ex1 | Ex2 | Ex3 | Ex4 | Ex5 | Ex6 | Ex7 | Ex8 | Ex9 | Ex10 | Ex11 |
|---|---|---|---|---|---|---|---|---|---|---|---|---|---|
| a) | AMPS | 207 | 14.8 | 10.0 | 14.8 | 14.8 | 14.8 | 14.8 | 14.8 | 14.8 | 14.8 | 14.8 | 16.3 |
| b) | CN964 | 3700 | 45.6 | 57.0 | | | | | | | | | |
| | CN991 | 1500 | | | 53.4 | 53.4 | | | | | | | |
| | CN981 | 2200 | | | | | 53.4 | | | | | | |
| | CN910 | 3600 | | | | | | 37.4 | | | | | |
| | CN2003EU | 3000 | | | | | | | 53.4 | | | | |
| | CNUVE150/80 | 4000 | | | | | | | | 42.7 | | | |
| | CN996 | 2850 | | | | | | | | | 53.4 | | |
| | CN965 | 5600 | | | | | | | | | | 53.4 | |
| | CN998 | 2200 | | | | | | | | | | | 40.1 |
| c) | IPA | | | 17.5 | 22.3 | 21.1 | 22.3 | 22.3 | 22.3 | 22.3 | 22.3 | 22.3 | 23.2 |
| | MeOH | | 23.7 | | | | | | | | | | |
| d) | TEA | 101.2 | 7.2 | 4.9 | | | | | | | | | |
| | Blm | 124 | | | 8.9 | 8.9 | 8.9 | 8.9 | 8.9 | 8.9 | 8.9 | 8.9 | 9.8 |
| e) | Darocur™ 1173 | | 0.5 | 0.5 | 0.5 | 0.5 | 0.5 | 0.5 | 0.5 | 0.5 | 0.5 | 0.5 | 0.5 |
| Other | TPGDA | 300 | 8.1 | 10.0 | | | | 16.0 | | 10.7 | | | |
| | HDDA | 226 | | | | | | | | | | | 10.0 |
| | MEHQ | | 0.1 | 0.1 | 0.1 | 0.1 | 0.1 | 0.1 | 0.1 | 0.1 | 0.1 | 0.1 | 0.1 |
| | Aerosil® 380 | | | | | 1.2 | | | | | | | |
| Total | | | 100 | 100 | 100 | 100 | 100 | 100 | 100 | 100 | 100 | 100 | 100 |
| | molar ratio b):a) | | 0.17 | 0.32 | 0.50 | 0.50 | 0.34 | 0.15 | 0.25 | 0.15 | 0.26 | 0.13 | 0.23 |
| | molar ratio d):a) | | 1.0 | 1.0 | 1.0 | 1.0 | 1.0 | 1.0 | 1.0 | 1.0 | 1.0 | 1.0 | 1.0 |
| | Temperature for dissolving | | 65° C. | 65° C. | 25° C. | 25° C. | 65° C. | 65° C. | 65° C. | 65° C. | 65° C. | 65° C. | 65° C. |
| | α$^{unsupp}$ (%) | | 92.4 | 94.3 | 93.5 | 94.5 | 93.2 | 93.8 | 91.0 | 93.8 | 94.6 | 92.3 | 93.5 |
| | ER$^{unsupp}$ (ohm · cm$^2$) | | 4.2 | 11.3 | 7.3 | 7.4 | 4.5 | 5.3 | 4.4 | 7.4 | 6.9 | 12.6 | 14.8 |
| | Water permeability$^{unsupp}$ (×10$^{-12}$ m$^3$/m$^2$ · s · kPa) | | 17.0 | | | | | | | | | | |
| | Swelling$^{unsupp}$ (wt %) | | 43 | 31 | 27 | 21 | 41 | 39 | 22 | 19 | 47 | 44 | 58 |
| | α$^{supp}$ (%) | | | 91.4 | | | 91.7 | 87.9 | 88.6 | 92.3 | 91.9 | | |
| | ER$^{supp}$ (ohm · cm2) | | | 22.5 | | | 6.0 | 8.3 | 7.7 | 13.1 | 18.8 | | |
| | Water permeability$^{supp}$ (×10$^{-12}$ m$^3$/m$^2$ · s · kPa) | | | 15.0 | | | 8.1 | 18.4 | 18.5 | 8.2 | | | |

$^{unsupp}$refers to the properties of the 'free film' membrane made by the method of the first aspect of the invention after the membrane had been removed from the support.
$^{supp}$refers to the properties of a composite membrane made from the same ingredients but comprising a non-woven strengthening material.

The invention claimed is:

1. A method for preparing an ionically-charged membrane comprising the steps:

(1) applying a film of curable composition to a support;
(2) curing the film of curable composition to give an ionically-charged membrane; and
(3) removing the ionically-charged membrane from the support;

wherein the curable composition comprises:

a) 5 to 50 wt % of curable compound comprising one ethylenically unsaturated group and an ionic group;
b) 10 to 70 wt % of crosslinking agent comprising at least two ethylenically unsaturated groups and having a molecular weight of at least 500 dalton per ethylenically unsaturated group; and
c) 5 to 60 wt % of inert solvent.

2. The method according to claim 1 wherein the crosslinking agent comprising at least two ethylenically unsaturated groups having a molecular weight of at least 700 dalton per ethylenically unsaturated group.

3. The method according to claim 1 wherein the crosslinking agent comprising at least two ethylenically unsaturated groups having a molecular weight below 10,000 dalton.

4. The method according to claim 1 wherein the said crosslinking agent has a solubility in water of less than 0.01 mol/l, when measured at 25° C.

5. The method according to claim 1 wherein the film is applied to the support by a method comprising curtain coating, blade coating, air-knife coating, knife-over-roll coating, slide coating, slot die coating, nip roll coating, forward roll coating, reverse roll coating, micro-roll coating, dip coating, foulard coating, kiss coating, rod bar coating or spray coating.

6. The method according to claim 1 wherein the curing is performed by a method comprising radical polymerisation using electromagnetic radiation.

7. The method according to claim 1 wherein the ionically-charged membrane is removed from the support by a method comprising peeling the ionically-charged membrane from the support.

8. The method according to claim 1 wherein the support is non-porous.

9. The method according to claim 1 wherein the composition further comprises d) an organic compound which can form a salt with component a), the organic compound being selected from the group consisting of tertiary amines having a molecular weight of less than 1000 dalton and organic acid anions having a molecular weight of less than 1000 dalton.

10. The method according to claim 1 wherein the molar ratio of component b) to a) is at least 0.05.

11. The method according to claim 9 wherein the molar ratio of d) to the total number of cationic and anionic groups in component a) is at least 0.8.

12. A curable composition comprising:
- a) 5 to 50 wt % of curable compound comprising one ethylenically unsaturated group and an ionic group;
- b) 10 to 70 wt % of crosslinking agent comprising at least two acrylic groups and having a molecular weight of at least 500 dalton per ethylenically unsaturated group; and
- c) 5 to 60 wt % of inert solvent.

13. The curable composition according to claim 12 wherein the molar ratio of component b) to a) is at least 0.05.

14. The curable composition according to claim 12 comprising:
- a) 8 to 40 wt % of curable compound comprising one ethylenically unsaturated group and a cationic or anionic group;
- b) 15 to 60 wt % crosslinking agent comprising at least two acrylic groups and having a molecular weight of at least 500 dalton per acrylic group;
- c) 8 to 40 wt % inert solvent;
- d) an organic compound which can form a salt with component a), the organic compound being selected from the group consisting of tertiary amines having a molecular weight of less than 1000 dalton and organic acid anions having a molecular weight of less than 1000 dalton; and
- e) 0.05 to 5 wt % radical initiator.

15. The curable composition according to claim 14 wherein the molar ratio of d) to the total number of cationic and anionic groups in component a) is at least 0.8.

16. The curable composition according to claim 12 wherein the molecular weight of component a) is less than 500 dalton.

17. The curable composition according to claim 12 further comprising d) an organic compound which can form a salt with component a), the organic compound being selected from the group consisting of tertiary amines having a molecular weight of less than 1000 dalton and organic acid anions having a molecular weight of less than 1000 dalton.

* * * * *